United States Patent
Sharp et al.

(10) Patent No.: US 10,446,992 B2
(45) Date of Patent: Oct. 15, 2019

(54) POWER UNITS WITH POWER OUTLETS AND USB PORTS

(71) Applicant: Snap-on Incorporated, Kenosha, WI (US)

(72) Inventors: William T. Sharp, Pleasant Prairie, WI (US); David D. Curry, Kenosha, WI (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

(21) Appl. No.: 15/959,981

(22) Filed: Apr. 23, 2018

(65) Prior Publication Data
US 2018/0323562 A1 Nov. 8, 2018

Related U.S. Application Data

(60) Provisional application No. 62/500,663, filed on May 3, 2017.

(51) Int. Cl.
| | |
|---|---|
| *H01R 25/00* | (2006.01) |
| *H01R 27/00* | (2006.01) |
| *H02G 3/08* | (2006.01) |
| *H01R 13/46* | (2006.01) |
| *H02G 3/18* | (2006.01) |
| *H01H 71/02* | (2006.01) |
| *H01R 13/713* | (2006.01) |

(Continued)

(52) U.S. Cl.
CPC .............. *H01R 27/00* (2013.01); *H01R 13/46* (2013.01); *H01R 25/003* (2013.01); *H02G 3/081* (2013.01); *H01H 71/025* (2013.01); *H01R 13/713* (2013.01); *H01R 13/73* (2013.01); *H01R 24/60* (2013.01); *H02G 3/18* (2013.01)

(58) Field of Classification Search
CPC ........ H01R 27/00; H01R 13/73; H01R 13/46; H01R 13/713; H02G 3/081; H02G 3/18; H01H 71/025
USPC ....... 439/538, 569, 638, 653, 654, 214, 639, 439/650, 651
See application file for complete search history.

(56) References Cited

U.S. PATENT DOCUMENTS

| | | |
|---|---|---|
| D380,733 S | 7/1997 | Parshad |
| D397,086 S | 8/1998 | Lin |

(Continued)

FOREIGN PATENT DOCUMENTS

| | | |
|---|---|---|
| CN | 102106048 | 12/2013 |
| CN | 103560350 | 2/2014 |

(Continued)

OTHER PUBLICATIONS

Canadian Office Action for Application No. 3,003,676 dated Feb. 28, 2019, 3 pages.

(Continued)

*Primary Examiner* — Abdullah A Riyami
*Assistant Examiner* — Nelson R. Burgos-Guntin
(74) *Attorney, Agent, or Firm* — Seyfarth Shaw LLP

(57) ABSTRACT

A power unit is disclosed that includes a first surface with one or more power outlets, and a second surface angularly disposed with respect to the first surface. The second surface has one or more universal serial bus (USB) ports, and a power switch disposed thereon. The angled nature of the second surface provides ease of access to the USB port(s) and power switch.

8 Claims, 2 Drawing Sheets

(51) Int. Cl.
*H01R 13/73* (2006.01)
*H01R 24/60* (2011.01)

(56) References Cited

U.S. PATENT DOCUMENTS

| | | | |
|---|---|---|---|
| D420,643 S | 2/2000 | Yu | |
| D467,875 S | 12/2002 | Barger et al. | |
| D495,658 S | 9/2004 | Cho | |
| 6,875,051 B2 * | 4/2005 | Pizak | H01R 25/003 |
| | | | 439/501 |
| D514,519 S | 2/2006 | Wakefield | |
| D546,286 S | 7/2007 | Lichtscheidl | |
| 7,407,392 B2 | 8/2008 | Cooke et al. | |
| 7,663,866 B2 | 2/2010 | Lee et al. | |
| D626,071 S | 10/2010 | Su et al. | |
| 8,115,335 B2 | 2/2012 | Menas et al. | |
| 8,119,910 B1 | 2/2012 | Golden et al. | |
| 8,376,782 B2 | 2/2013 | Govekar | |
| D682,789 S | 5/2013 | Au | |
| 8,491,329 B2 | 7/2013 | Hsu | |
| 8,994,330 B2 | 3/2015 | Kuo et al. | |
| 9,112,298 B1 | 8/2015 | Hayden et al. | |
| 9,153,997 B2 | 10/2015 | Liao et al. | |
| 9,543,770 B1 | 1/2017 | O'Keefe et al. | |
| D816,038 S * | 4/2018 | Lu | D13/137.3 |
| D816,039 S * | 4/2018 | Lu | D13/139.8 |
| 2008/0012423 A1 | 1/2008 | Mimran | |
| 2011/0287665 A1 * | 11/2011 | Chien | F21S 8/035 |
| | | | 439/638 |
| 2012/0295662 A1 | 11/2012 | Haubrich | |
| 2014/0248795 A1 * | 9/2014 | Beldock | H01R 25/006 |
| | | | 439/536 |
| 2015/0009652 A1 * | 1/2015 | Alexander | H01R 35/04 |
| | | | 362/95 |
| 2015/0194048 A1 | 7/2015 | Haubrich | |
| 2015/0333461 A1 * | 11/2015 | Byrne | H01R 25/006 |
| | | | 361/623 |
| 2016/0003466 A1 * | 1/2016 | Chien | F21V 33/0004 |
| | | | 362/234 |
| 2016/0064883 A1 * | 3/2016 | Macauda | B25F 5/00 |
| | | | 439/40 |
| 2016/0070324 A1 * | 3/2016 | Emby | G06F 1/266 |
| | | | 710/110 |
| 2016/0190748 A1 * | 6/2016 | Emby | H01R 13/6691 |
| | | | 340/654 |
| 2016/0204561 A1 * | 7/2016 | Stephens | H01R 24/78 |
| | | | 439/653 |
| 2016/0218469 A1 | 7/2016 | Smed | |
| 2016/0268825 A1 * | 9/2016 | Byrne | H02J 7/0044 |
| 2018/0062302 A1 * | 3/2018 | DeBlois | H01R 9/2408 |
| 2018/0323555 A1 * | 11/2018 | Sharp | H02G 3/10 |
| 2019/0073884 A1 * | 3/2019 | Payne | G01R 1/20 |

FOREIGN PATENT DOCUMENTS

| | | |
|---|---|---|
| CN | 204257899 | 4/2015 |
| CN | 204391375 | 6/2015 |
| CN | 204858208 | 12/2015 |

OTHER PUBLICATIONS

Taiwan Office Action for Application No. 107115007 dated Oct. 3, 2018, 5 pages.
UK Combined Search and Examination Report for Application No. GB1807277.7 dated Nov. 5, 2018, 6 pages.
Australian Office Action for Application No. 2018203055 dated Nov. 9, 2018, 5 pages.
CyberPower Pro Series—Outlet Surge Protector, https://bhphotovideo.com/c/product/1117526-REG/cyberpower_csp600wsu_pro_6_outlet_dual_usb_surge/html, retrieved Jan. 17, 2019, 3 pages.
ORICO 4AC Outlet Power Strip with 5USB Charging Post (OSJ-4A5U-US) http://orico.cc/goods.php?id=6446, retrieved Jan. 17, 2019, 7 pages.
BESTEK 6-Outlet Power Strip Surge Protector with 6-Foot Power Cord and 2.4A 2-Port USB Charging Station, UL Listed, https://www.amazon.com/Accessories-BESTEK-6-Outlet-Protector-Charging-x/dp/B01M5BEB7M, Retrieved Jan. 17, 2019, 12 pages.
BESTEK Quick Charger Surge Protector Desk Power Strip with 8 Outlets 6-Foot Cord and 7.5A 4-Port USB Charging Station, https://www.amazon.com/bestek-charger-protector-outlets-charging/dp/B019W102U0, retrieved Jan. 17, 2019, 9 pages.
Taiwan Office Action for Application No. 107115007 dated Apr. 23, 2019, 5 pages.

* cited by examiner

POWER UNITS WITH POWER OUTLETS AND USB PORTS

CROSS-REFERENCE TO RELATED APPLICATIONS

This application claims priority to U.S. Provisional Patent Application No. 62/500,663, entitled Power Strip with USB Ports, filed May 3, 2017, the contents of which are incorporated by reference herein in their entirety.

TECHNICAL FIELD OF THE INVENTION

The present invention relates generally to power units or strips. More particularly, the present invention relates to power units with universal serial bus (USB) ports.

BACKGROUND OF THE INVENTION

Power units and/or power strips are used to provide power to one or more electronic devices, such as tools, tool chargers, computers, and other electrical devices. However, in certain areas, such as work areas, the location and ease of access of the ports on the power strip can be a concern.

SUMMARY OF THE INVENTION

The present invention relates to a power unit that includes a first surface with one or more power outlets, and a second surface angularly disposed with respect to the first surface. The second surface has one or more universal serial bus (USB) ports, and a power switch disposed thereon. The angled nature of the second surface provides ease of access to the USB port(s) and power switch.

In an embodiment, a power unit includes a housing having a first surface and a second surface disposed at an angle with respect to the first surface. A power outlet is disposed on the first surface, and a universal serial bus port is disposed on the second surface. The angle may be about 20-60 degrees, about 30-50 degrees, and more particularly, about 45 degrees.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION

Figure 1:
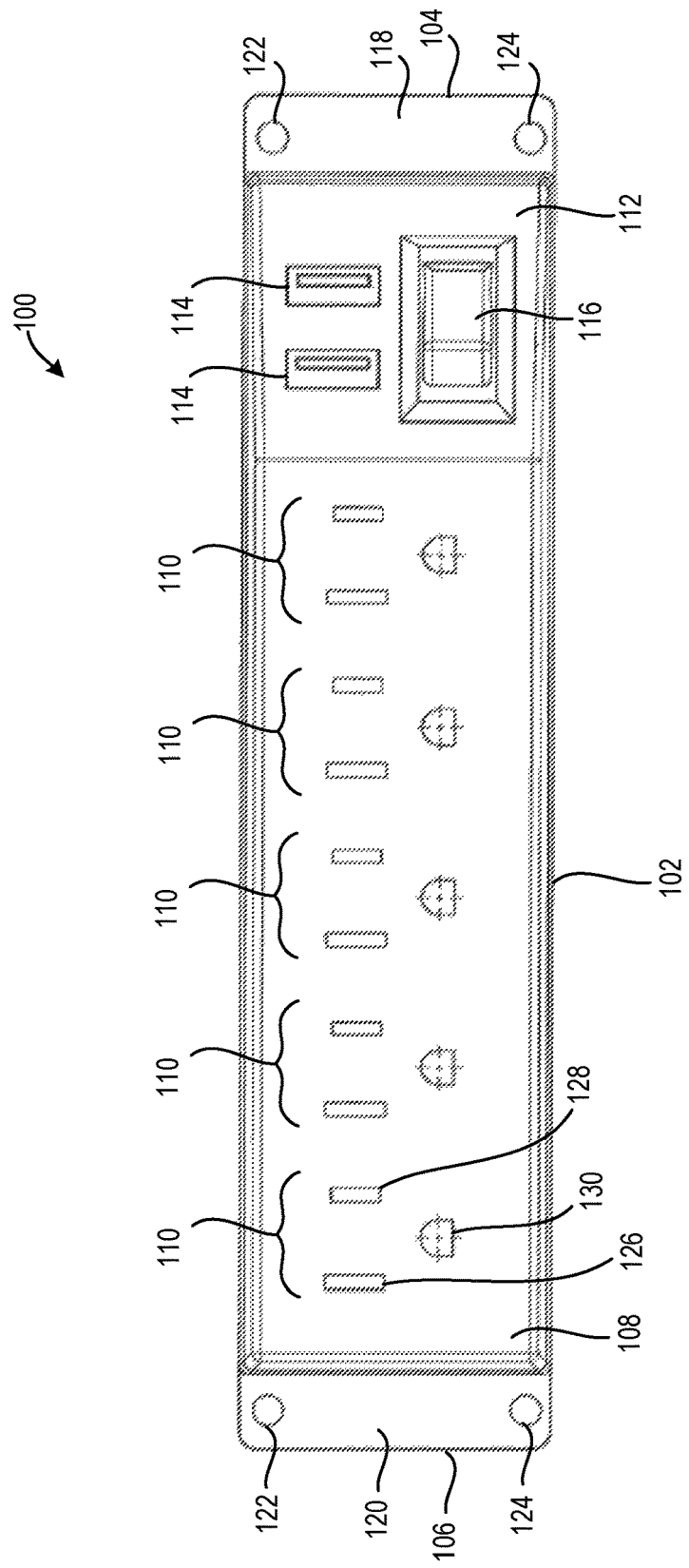
FIG. 1 is a top view of a power unit according to an embodiment of the present invention.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present application discloses a power unit that includes a first surface with one or more power outlets, and a second surface angularly disposed with respect to the first surface. The second surface has one or more universal serial bus (USB) ports, and a power switch disposed thereon. The angled nature of the second surface provides ease of access to the USB port(s) and power switch.

Figure 2:
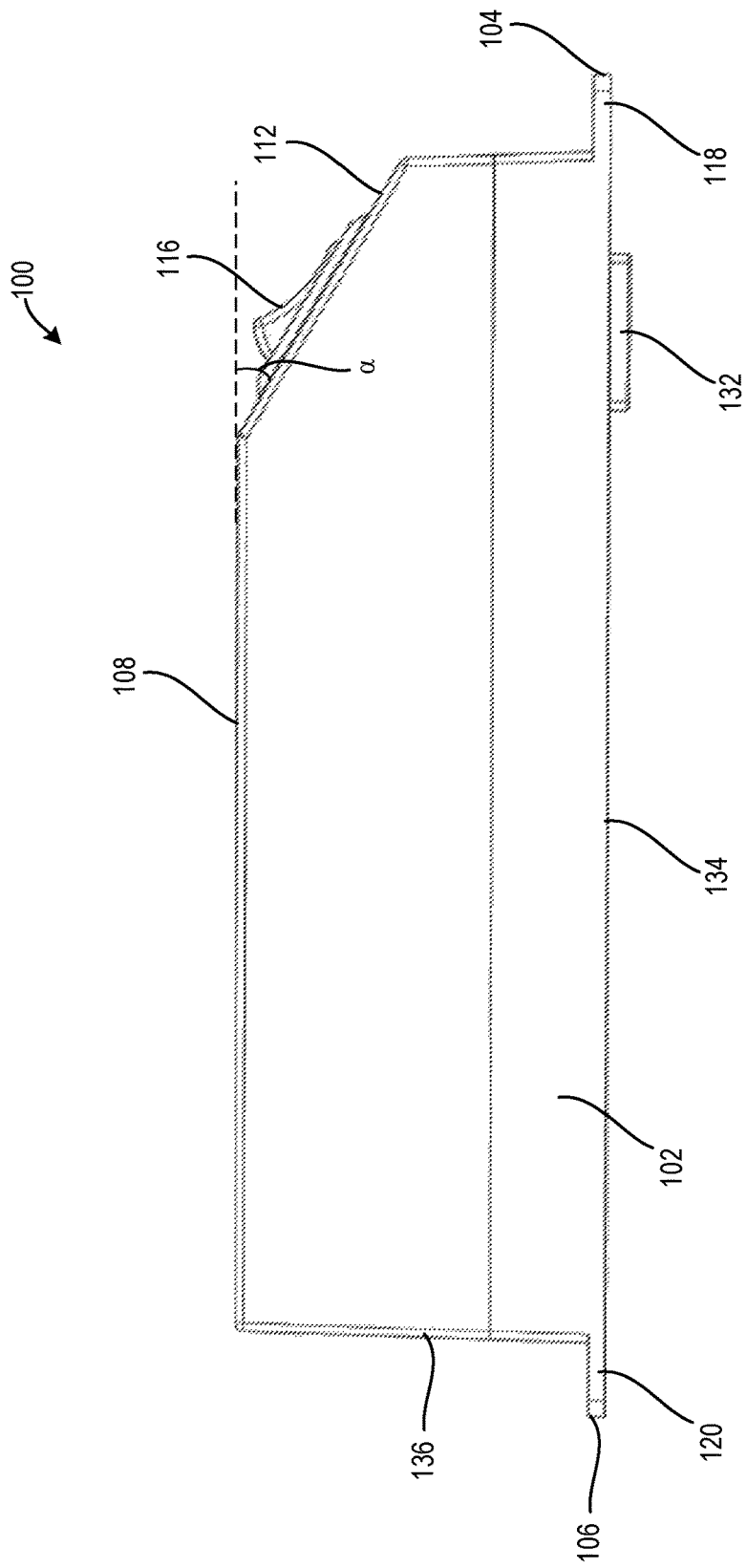
FIG. 2 is a side view of the power unit of FIG. 1.

Referring to FIGS. 1 and 2, a power unit 100 includes a housing 102 having first and second opposing ends 104, 106, respectively. The power unit 100 includes a first surface 108 that includes one or more power outlets 110 disposed thereon, and a second surface 112 that extends from and is angularly disposed with respect to the first surface 108. One or more universal serial bus (USB) ports 114, and a power switch/circuit breaker 116 may be disposed on the second surface 112.

As illustrated, the first and second ends 104, 106, include first and second flanges 118, 120, respectively. Each of the first and second flanges 118, 120 includes first and second fastener apertures 122, 124. The power unit may have a length of about eight inches, from the first end 104 to the second end 106. A distance between a center of the first fastener apertures 122 on the first and second flanges 118, 120 may be about 7.5 inches. Further, a distance (width wise) between a center of the first and second fastener apertures 122, 124 on the first flange 118 may be about 1.5 inches. Similarly, a distance (width wise) between a center of the first and second fastener apertures 122, 124 on the second flange 120 may be about 1.5 inches. These dimensions may allow the power unit 100 to couple to standard tool storage cabinets and tool boxes.

The first surface 108 extends from proximate to the second end 106, along a length of the power unit towards the first end 104, and terminates at the second surface 112. The second surface 112 extends from the first surface 108 at an angle with respect to the first surface 108, and along the length of the power unit towards the first end 104.

The one or more power outlets 110 are disposed on or in the housing 102 and accessible by a user on the first surface 108. As illustrated, five power outlets 110 may be disposed on the first surface 108. The power outlets 110 may be aligned with one another and disposed next to one another along a length of the first surface 108. Each power outlet 110 may include a neutral port 126, a hot port 128, and a ground port 130. However, it should be appreciated that more or less than five power outlets 110 may be included, and the dimensions of the power unit 100 may be modified accordingly.

Further, as illustrated in FIG. 1, each of the power outlets 110 are oriented in a same direction and spaced from one another to provide clearance between the power outlets 110. However, it should be appreciated that the power outlets 110 may have differing orientations.

As described above, the second surface 112 extends from the first surface 108 at an angle $\alpha$ with respect to the first surface 108, and along the length of the power unit towards the first end 104. The angle $\alpha$ may be about 20-60 degrees, about 30-50 degrees, and more particularly, about 45 degrees with respect to the first surface 108.

The USB ports 114 and power switch/circuit breaker 116 may be disposed in or on the housing 102 and accessible by a user on the second surface 112. The power switch/circuit breaker 116 may be disposed on a first side of the second surface 112, and the USB ports 114 may be disposed next to the power switch/circuit breaker 116, on a second side of the second surface 112. As illustrated, there are two USB ports 114 disposed on the second surface, and have a length oriented to extend along a width of the power unit 100.

However, it should be appreciated that the orientation of the USB ports 114 and power switch/circuit breaker 116 may be altered to suite a particular need. For example, the orientation of the USB ports 114 and power switch/circuit breaker 116 may be rotated (from the orientation illustrated in FIG. 1) by about 90, 180, or 270 degrees with respect to the second surface 112.

Referring to FIG. 2, the power outlet may also include a power inlet port 132 that is adapted to couple to a power source for supplying power to the power outlets 110, USB ports 114, and power switch/circuit breaker 116. The power inlet port 132, may also be a corded plug extending from the power unit 100. Power may be provided into the power unit 100 via the power inlet port 132, and to the power switch/circuit breaker 116. When the power switch/circuit breaker 116 is in an ON position, power is provided to the power outlets 110 and USB ports 114. When the power switch/circuit breaker 116 is in an OFF position, power is prevented from flowing to the power outlets 110 and USB ports 114. The power switch/circuit breaker 116 may also include a circuit breaker adapted to protect the power outlets 110 and USB ports 114, as well as any electrical device plugged into the power outlets 110 and/or USB ports 114 from power surges, etc.

As illustrated, the power inlet port 132 is disposed on a third surface 134 or bottom of the power unit 100. However, the power inlet port 132 may be disposed on any other surface, such as side surface 136.

The power unit 100 may be coupled to a tool storage cabinet or tool box, by installing fasteners through the fastener apertures 122 and 124. The power unit 100 may be directly coupled onto a surface of the tool storage cabinet or tool box. Alternatively, the first and second surfaces 108, 112 may be extended through an aperture in a surface of the tool storage cabinet or tool box, with the flanges 118 and 120 disposed adjacent to a side of the surface opposite that of the first and second surfaces 108, 112. This allows the power unit 100 to be coupled to the tool storage cabinet or tool box, with the fasteners and flanges 118 and 120 hidden from view.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object. As used herein, the term "a" or "one" may include one or more items unless specifically stated otherwise.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A power unit, comprising:
   a housing having first, second, and third surfaces and first and second opposing ends, wherein the first surface extends from the first opposing end in a direction towards the second opposing end and is substantially parallel to the third surface, and the second surface extends from the first surface towards the second opposing end and is disposed at an angle with respect to the first surface;
   a power outlet is disposed on the first surface; and
   a universal serial bus (USB) port is disposed on the second surface.

2. The power unit of claim 1, wherein the angle is about 20-60 degrees.

3. The power unit of claim 1, wherein the angle is about 30-50 degrees.

4. The power unit of claim 1, wherein the angle is about 45 degrees.

5. The power unit of claim 1, further comprising a power switch disposed on the second surface.

6. The power unit of claim 5, wherein the power switch includes a circuit breaker.

7. The power unit of claim 1, further comprising a flange and a fastener aperture disposed on the flange.

8. The power unit of claim 7, wherein the flange is disposed on the third surface.

* * * * *